PIPE LAYDOWN AND PICKUP MACHINE

BACKGROUND OF THE INVENTION

1. Field of the Invention

The invention generally relates to an apparatus for picking up and laying down pipe sections, casing sections or the like employed during the drilling of a well or while other operations are being conducted in relation to a well such as an oil well or the like and more particularly to an apparatus for picking up a pipe section from a catwalk and conveying it to the drill rig or returning a pipe section to the catwalk from the drill rig and includes a draw works and cable assembly associated with the catwalk and a supporting post oriented in the rathole pipe in the drill rig floor.

2. Description of the Prior Art

The handling of elongated pipe or casing sections has long been a problem when making up or breaking down an elongated, multiple section string such as is used in oil well drilling and other procedures associated with oil wells and other wells. In view of the elongated nature of the pipe sections and the weight thereof, the pipe sections cannot be effectively handled without utilization of mechanical devices. Many devices have been developed for handling pipe including my prior U.S. Pat. Nos. 3,159,286, issued Dec. 1, 1964 and 3,169,645, issued Feb. 16, 1955 and other devices and apparatuses have been disclosed in prior U.S. Pat. Nos. 1,621,009, issued Mar. 13, 1927, 2,201,813, issued May 21, 1940; 2,425,292, issued Aug. 12, 1947; 2,539,751, issued Jan. 30, 1951; 2,690,046, issued Oct. 5, 1954; and 3,065,865, issued Dec. 27, 1962.

While the previously known devices have improved the handling techniques and apparatuses and have been used extensively, problems still exist in effectively and efficiently handling pipe sections in a manner which is not only efficient but also will insure the safety of personnel on the catwalk, drill rig floor and the like.

SUMMARY OF THE INVENTION

An object of the present invention is to provide a pipe laydown and pickup machine for moving or conveying a pipe section from the catwalk to the drill rig or from the drill rig to the catwalk and includes a draw works, cable assembly and carriages or dollies supported thereby for picking up a pipe section in a secure manner and moving it to a desired position with the cable assembly that is remote from the draw works being supported by a post oriented in the rathole in the drill rig floor.

Another object of the invention is to provide an arrangement in which the pipe supporting carriages or dollies are stabilized by engagement with vertically spaced cables to prevent the dollies from swinging laterally to facilitate their assembly with the pipe sections and to maintain the dollies and pipe sections in stable condition.

Another object of the invention is to provide a device in accordance with the preceding object in which a counterbalance weight is connected to one of the dollies for biasing it away from the draw works and to assure its proper positioning in relation to the pipe section being handled.

A further object of the invention is to provide a pipe laydown and pickup machine in which the support for the cable is vertically adjustable and readily removable from the rathole pipe in the drill rig floor.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmental perspective view illustrating the pipe laydown and pickup machine associated with the pipe rack, catwalk and drill rig structure.

FIG. 2 is a side elevational view of the machine illustrating its relationship to the catwalk when a pipe section is oriented on the catwalk.

FIG. 4 is a detailed elevational view of the supporting post structure received in the rathole in the drill rig floor.

FIG. 5 is a group perspective view illustrating a vertically adjustable structure attached to the catwalk to facilitate movement of the pipe sections to and from the pipe rack.

FIG. 6 is a group perspective view illustrating alternative structures connectible to the dollies for engagement with pipe or casing sections of different sizes.

DESCRIPTION OF THE PREFERRED EMBODIMENT

Figure 3:
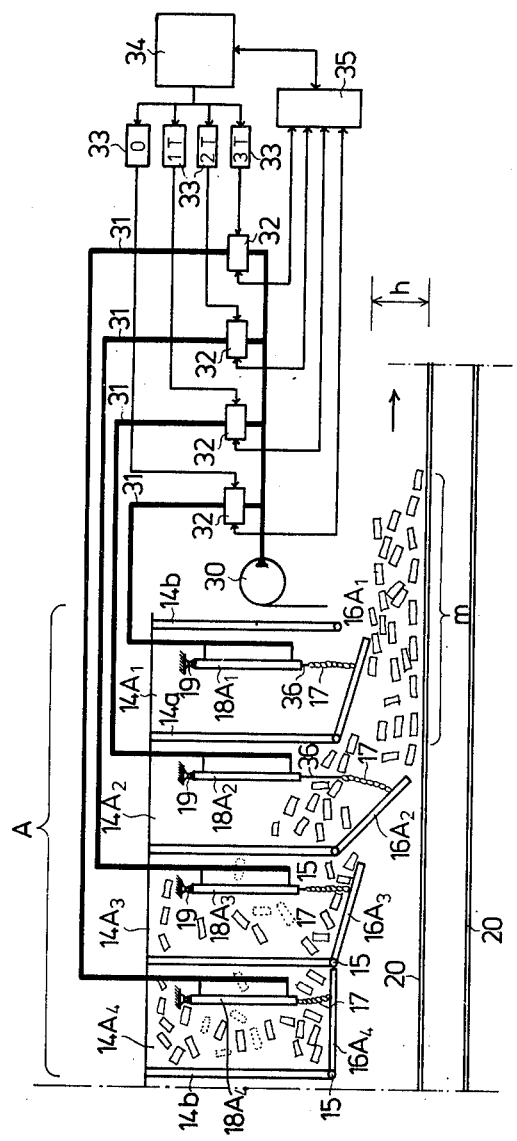
FIG. 3 is a schematic view of the cable arrangement.

The pipe laydown and pickup machine of the present invention is associated with equipment normally located at a well site and which includes a drill rig or derric generally designated by the numeral 10 and which includes a rig floor 12 supported above the ground surface in any suitable manner and provided with the usual crown block, traveling blocks, elevators and other associated equipmenet not illustrated in detail inasmuch as the conventional componenets form no particular part of the present invention. Disposed to one side of the drill rig 10 is a catwalk 14 of conventional construction which basically involves a horizontal supporting surface and an inclined ramp or slide 16 extends from the catwalk 14 to the rig floor 12 in a conventional manner. A pipe rack 18 is oriented alongside of the catwalk and pipe sections 20 are stored on the pipe rack 18 in a conventional and well known manner. The rig floor 12 includes a conventional rotary table 22 and a rathole pipe 24 and rathole support structure 26 all of which represent conventional structures incorporated into the drill rig.

Mounted on the end of the catwalk remote from the rig is a draw works or winch assembly generally designated by the numeral 27 with the catwalk including an extension for supporting the draw works or the draw works may be supported on a separate vehicle alined with the end of the catwalk. The draw works includes winch drums 28, 30 and 32 having cables 34, 36 and 38 wound thereon and passing over guide pulleys or sheaves rotatably supported on an elevated frame 40.

The cables extend to and are supported by a support assembly 42 in the form of a tubular post or pipe 44 telescoped into the rathole pipe 24. The rathole pipe 24 is provided with a collar 46 on the upper end thereof above the support 26 with the collar 46 including a plurality of setscrews 48 which enables vertical adjustment of the pipe 44 in relation to the rathole pipe 24.

Telescoped into the pipe 44 is a short supporting pipe 50 secured in place by setscrews 52 in the upper end of the pipe 44 to enable removal of the supporting pipe 50

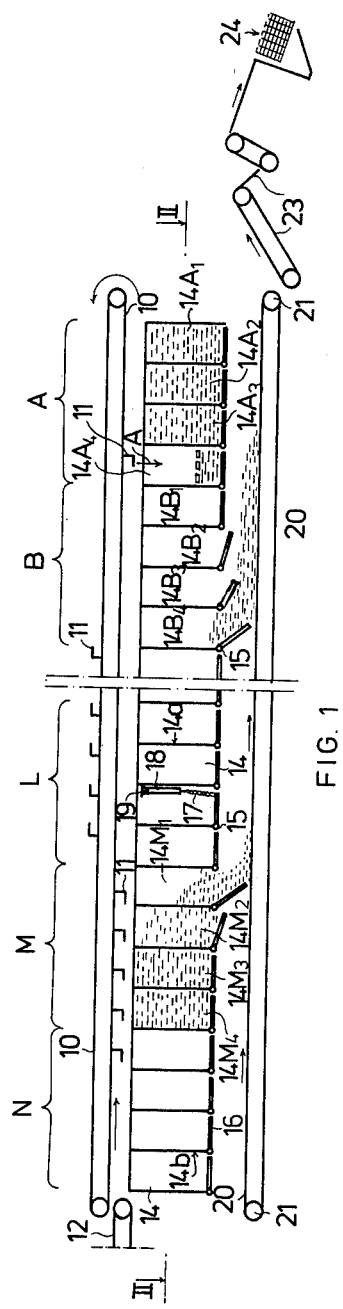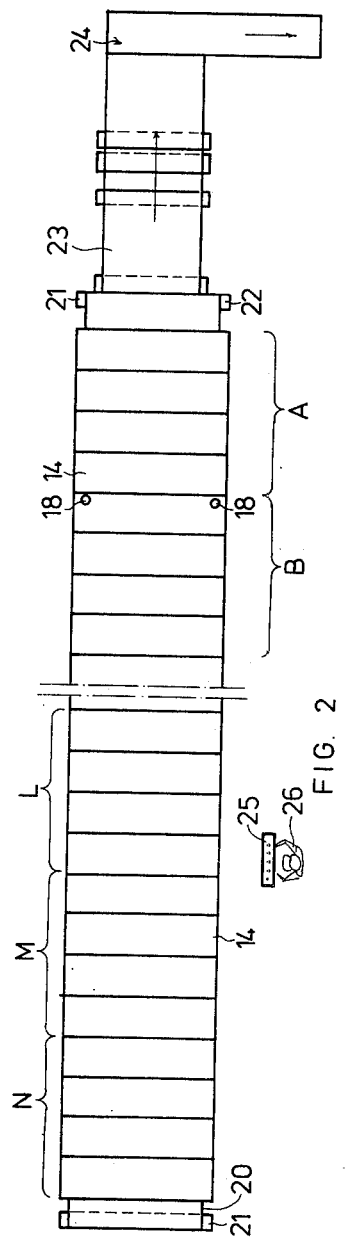

METHOD AND APPARATUS FOR HANDLING ARTICLES OF DIFFERENT TYPES

BACKGROUND OF THE INVENTION

The present invention relates to methods and apparatus for handling articles, such as pieces of timber, of different types.

Thus, the present invention relates to a method and apparatus for sorting articles such as sawed timber pieces of different qualities and/or lengths, in such a way that a relatively large number of consecutive sorting compartments are utilized with the articles of given types situated in these compartments to be transferred therefrom, primarily by gravity, onto a conveyer situated below the compartments, this conveyer delivering the articles to a location where the articles are treated as by being packaged, with the articles being delivered to the conveyer after the compartments are filled. The transfer of the articles from the compartments to the conveyer situated therebeneath is preferably carried out by way of yieldable bottom closures for the compartments which can be controlled so as to open and close the compartments, these closures for example taking the form of walls which are hinged at one side to each compartment so as to be swingable to and from positions closing and opening the compartment.

It is already known in connection with sorting of sawed pieces of timber to utilize installations having an overhead conveyer provided with supports for carrying pieces of timber and including a triggering means which can be actuated so that the sawed pieces of timber are released from the conveyer to drop into certain compartments situated beneath the overhead conveyer. These compartments may be made up of a relatively large number of consecutive compartments arranged in a row, these compartments numbering several tens of compartments, with at least one compartment being provided for a given type and/or quality of timber pieces. Each compartment has a bottom which can be opened and through which a batch of timber accumulated within the compartment is dropped primarily by gravity onto a conveyer situated beneath the compartment, this conveyer transporting the timber batches to a mechanism which meters the timber pieces to a packaging device, for example. Thus, the structure which receives the articles from the conveyer beneath the compartments treats the articles one by one so as to arrange them in a continuous layer which is fed to suitable packaging equipment.

The above-mentioned triggering structure for the overhead conveyer receives a pulse under the control of an individual who works at a sorting table or console situated in the region of the installation, or an automatic device may be provided for automatically triggering the release of the articles to drop into a particular compartment at the exact moment when the particular article is situated above the compartment intended to receive the same. Thus in this way the pieces of sawed timber will be dropped into the correct compartments.

It is also known to provide various sorting chambers which operate according to an elevator principle, the bottom of such chambers descending automatically as the compartment fills. The advantages of this type of compartment which operates according to the elevator principle is that there is only a relatively small height through which the articles drop from the overhead conveyer into the compartment. On the other hand, such compartments have an exceedingly complex construction and are expensive. However, it has frequently been considered proper to utilize sorting compartments operating according to the elevator principle when very large compartments are utilized.

Both in connection with stationary and elevator types of compartments, the opening and closing at the bottom ends thereof has in recent times generally been arranged to take place, for example, in a manner disclosed in Finnish Pat. No. 44,352, utilizing compartment bottoms which are swingably hinged at one side and which are opened in a controlled manner by way of hydraulic cylinders or the like, actuating structure such as ropes or reels, utilized so as to render the bottoms yieldable in an upward direction.

Modern sorting installations of the above general type have a high capacity. Thus, such installations are capable of handling more than 100 pieces per minute. Thus, the operations in connection with emptying of the compartments and subsequent transport of the articles to devices such as packaging devices has become an important factor. This factor frequently forms a bottleneck which determines the capacity of the entire sorting installation. One of the reasons for this latter condition resides in the fact that in particular in Nordic countries procedures in recent times have generally been adopted for sorting articles such as timber pieces according to length and tying all of the pieces of a given length into a package which itself is composed of a plurality of smaller packages, such as, for example, four smaller packages each of which has articles of identical lengths or quality, and these subsidiary packages are tied into a single package. The quantity of timber which is required to make up one of the smaller subsidiary packages is quickly gathered in a sorting compartment, so that it is necessary that such a compartment should be emptied and its contents transferred to the packaging operation in a rapid manner. Sorting compartments of even a relatively large size have been provided in such a way that they can accommodate, for example, sawed timber pieces for making four small packages. Experience has shown, however, that it is exceedingly awkward to transfer such a large quantity of timber to the conveyer therebeneath in a controlled manner. In particular it is difficult to arrange a relatively large heap of timber pieces so that they will form, piece by piece, a layer suitable for packaging purposes. It is particularly in connection with this latter phase of the operation, involving arranging of the timber pieces in a uniform layer, which results in damage to the timber pieces and in troubles in connection with the operation of the equipment, particularly where relatively large compartments are utilized.

Thus, it is highly desirable to provide an arrangement according to which the articles such as timber pieces when discharged onto the conveyer therebeneath can be made to assume the shape of a uniform layer of relatively small depth, with the pieces of timber retaining their proper succession and orientation. In this way it is possible to facilitate the further transport of the timber pieces and the proper handling thereof for packaging purposes. However up to the present time these objectives have not been met by known procedures and installations.

It is to be noted that the operations in connection with emptying consecutive compartments in a sorting installation have also been rendered difficult as a result of the fact that the sorting section is quite long, including several tens of compartments, this situation also being complicated by the fact that a number of compartments may become filled almost simultaneously, so that they should be rapidly emptied and ready to receive the next pieces of timber which arrive at the overhead conveyer. Thus, one of the drawbacks encountered with presently known installations resides in the fact that even though there is automation, nevertheless the supervision of a long sorting installation with dozens of compartments requires an operator to be on hand at a suitable location.

SUMMARY OF THE INVENTION

It is accordingly a primary object of the present invention to provide a method and apparatus which will avoid the above drawbacks.

Thus, it is an object of the present invention to provide a method and apparatus which make it possible to deposit from compartments over a conveyer articles of a given type from a given plurality of compartments in such a way that the articles form on the conveyer a uniform layer of the articles of a predetermined depth.

A further object of the present invention is to provide a method and apparatus according to which the discharge of the articles from the compartments can be precisely controlled.

In addition it is an object of the present invention to provide a method and apparatus according to which it is possible to utilize for the articles compartments which are of a relatively small size, particularly a size according to which the amount of articles in a given compartment correspond to one package which will subsequently be made from the articles.

Furthermore it is an object of the present invention to provide a method and apparatus according to which the layer of articles deposited on the conveyer beneath the compartments is such that it is exceedingly convenient to handle these articles for the purpose of making packages therefrom.

Yet another object of the present invention is to provide a method and apparatus of the above type according to which the possibility of breakage of the articles is greatly reduced.

In addition it is an object of the present invention to provide a method and apparatus according to which the installation itself will not be damaged as, for example, by conveyed articles engaging a swingable closure wall of a compartment.

In order to achieve the above objectives, the method of the invention is carried out in such a way as to deliver articles, such as pieces of timber, of different types respectively to different groups of compartments with each group having one compartment nearer to a discharge end of a conveyer beneath the compartments than the next compartment of a given group, the emptying of the articles from the groups of compartments being carried out in such a way that in accordance with a predetermined program there is a sequential discharge of articles of the same type from a given group of compartments first from the compartment of the latter group nearest to the discharge end of the conveyer means and then from the next compartment in such a way that a relatively uniform layer of the articles forms on the conveyer which receives the articles.

The apparatus of the invention includes a series of compartments of the above type arranged in a row longitudinally over an elongated conveyer at the discharge end of which the articles are delivered to a given location, this series of compartments having therealong different groups which follow one after the other and which are adapted respectively to receive the articles, such as pieces of timber, of different types. Each compartment has at its lower end a means for opening and closing the compartment, and a control means is provided for controlling the latter means of a given group of compartments in such a way that for a given group of compartments the articles are discharged therefrom sequentially first from the compartment of the group nearest to the discharge end of the conveyer means and then from the next compartment, according to a predetermined sequence determined by the particular program.

BRIEF DESCRIPTION OF DRAWINGS

The invention is illustrated by way of example in the accompanying drawings which form part of this application and in which:

FIG. 1 is a schematic elevation of one possible method and apparatus according to the invention, the particular apparatus shown in FIG. 1 being used for sorting timber pieces;

FIG. 2 is a schematic top plan view of the arrangement of FIG. 1, taken line II—II of FIG. 1 in the direction of the arrows; and FIG. 3 is a schematic illustration of one group of compartments together with a control means connected thereto for controlling the opening and closing of the compartments.

DESCRIPTION OF PREFERRED EMBODIMENTS

Referring first to FIGS. 1 and 2, there is schematically illustrated therein a sorting installation for sorting articles of different types which in the case of FIGS. 1 and 2 are pieces of sawed timber. These pieces of timber may be of different types either because they are of different sizes, such as of different lengths, for example, or because they are of different qualities, as distinct from the size thereof, and of course both of these factors may enter into the determination of a given type of the articles which are handled in accordance with the method and apparatus of the invention. FIG. 1 illustrates an overhead conveyer 10 which includes carriers 11 which receive the pieces of timber from a supply conveyer 12 fragmentarily illustrated at the left of FIG. 1. The sawed timber pieces are fed in a controlled manner from the conveyer 12 to the carriers 11 of the conveyer 10, the means by which these articles are delivered from the supply conveyer 12 to the conveyer 10 being well known in the art, and the structure of the carriers 11 also is well known in the art. Situated beneath the conveyer 10 is a row of compartments 14 distributed longitudinally along the conveyer 10 so that the carriers 11 transport pieces of timber across the top open ends of the several compartments 14. In connection with the carriers 11 and the compartments 14 situated beneath the same, known controls can be provided, from a suitable console, for example, as illustrated in FIG. 2, for transmitting signals to the carriers 11 in such a way that when articles of a given type carried thereby are situated over compartments 14 which are to receive the particular articles of the particular type, the carriers 11 release the articles so that they will be received in the intended compartments 14. Thus, through such a suitable program means it is possible in a known way to cause the timber pieces to be dropped from the conveyer 10 into particular compartments 14 which are intended to receive the particular pieces of timber which have given properties such as a given quality and/or length. A relatively large number of sorting compartments are provided, most commonly several tens of these compartments arranged in a row in succession as illustrated in FIG. 1 and distributed longitudinally along the conveyer 10 beneath the latter.

Beneath the row of compartments 14 is a lower conveyer means 20 for receiving the articles from the several compartments 14 and for delivering the articles to a predetermined location situated at the right discharge end of the conveyer means 20, as viewed in FIG. 1. Each of the compartments 14 has at its lower end a means in the form of a swingable wall 16 for opening and closing each compartment. FIG. 1 shows the end rolls 21 for the lower conveyer 20, and this conveyer as well as the overhead conveyer 10 are driven from any suitable source of power. This conveyer means 20 transports the batches of timber which have accumulated in the compartments and which are dropped onto the conveyer means 20 to a means 23 which dismembers or takes apart the several articles to form therefrom a single layer of the articles, so that in this way the articles can be delivered separately one after the other, piece by piece, to a packaging installation.

According to the method and apparatus of the invention, the row of compartments 14 is divided into several groups or pluralities of compartments, and FIGS. 1 and 2 schematically illustrate the groups A, B, ... L, M, N of compartments. In the illustrated example each of these groups A–N includes four compartments situated in immediate succession one after the other, with the four compartments of each group all receiving the same type of article, but of course the several groups will receive, for example, different types of articles even though the compartments of each group all receive the same type of article. As was indicated above, each of the compartments 14 is capable of being opened and closed at its bottom end by way of a means which includes the swingable closure wall 16 at the bottom end of each compartment. These means for opening and closing the several compartments are controlled according to a predetermined program in such a way that when a starting signal is transmitted to a given group of compartments for emptying the latter, the particular group of compartments will be emptied automatically in such a way that the first of the group of compartments which is nearest to the discharge end of the conveyer means 20 will be the first to discharge its contents, whereupon in accordance with the program the next compartment is emptied, and so on through the third and fourth compartments of each group. Thus the several compartments of each of the groups A–N will be opened and emptied in accordance with a suitable mutual timing relationship between the several compartments of each group.

As is shown in FIG. 1, the first three compartments $14A_1$, $14A_2$, and $14A_3$ of the group A have already been filled, preferably one at a time, and the fourth compartment $14A_4$ is being filled for example by dropping of a piece of timber from a carrier 11 of the overhead conveyer 10 into this particular compartment. This operation is indicated by the arrow A in FIG. 1. Furthermore, as may be seen from FIG. 1, at this particular time when the particular group of compartments A has its compartments almost completely filled, the articles from the group M are being emptied from the compartments thereof, this emptying operation for the group M having been begun by the opening of the first compartment $14M_1$ of this group which is nearest to the discharge end of the conveyer means 20, the next compartment $14M_2$ of this particular group being illustrated in FIG. 1 in a condition where it has just started to be opened to start the discharge of articles therefrom. The succeeding compartments $14M_3$ and $14M_4$ of this group are still closed. These latter compartments will be successively opened in accordance with the predetermined timed sequence of the particular program. Moreover, in the particular example shown in FIG. 1, the group of compartments B is in a condition where the emptying of this particular group has almost been completed with the timber pieces being shown in FIG. 1 while they are being discharged from the last compartment $14B_4$ of this particular group. It will be noted that not only has the first compartment $14B_1$ of this particular group already been completely emptied, but in addition its closure wall has been returned to its closed position, and the closure wall of the next compartment $14B_2$ is shown in a position where it has almost returned to its closed position. The operation of the means which includes the walls 16 for opening and closing the several compartments may be carried out for each group in such a way that the successive compartments can be closed one by one either in response to same starting signal which start at the emptying of the group of compartments, or after a given group of compartments have been completely emptied the operator 26 at the console 25, as shown in FIG. 2 may provide a signal which will result in the closing of all of the compartments of a given group either all at the same time or in a given sequential timed relationship one after the other.

In the embodiment of the invention illustrated the means at the bottom ends of the compartments for respectively opening and closing the same includes, as pointed out above, a closure wall 16, this wall 16 having in its closed position a right edge, as viewed in FIG. 1, nearer to the discharge end of the conveyer means 20 than its left edge, and the walls 16 are respectively hinged to vertical walls of the compartments at the left edges of the walls 16, or in other words at the edges of these walls which are most distant from the discharge end of the conveyer means 20. Thus, each pair of successive compartments are separated one from the next by a common vertical wall so that each compartment has a right vertical inner surface 14b nearer to the discharge end of the conveyer means 20 than the left vertical inner surface 14a of each compartment, as viewed in FIG. 1. The closure walls 16 are hinged to the compartments so that they are swingable at these left inner surfaces 14a thereof while having free edges which in the closed positions of the wall 16 are adjacent but spaced slightly from the right inner surfaces 14b of the several compartments, respectively. It is of advantage to provide a construction according to which these bottom closure walls 16 of the several compartments 14 are not secured in their upper closed positions by any latching structure. Instead these walls 16 are respectively suspended from one or two flexible members 17 forming part of a yieldable means for displacing the wall 16 between its open and closed positions. Thus, the flexible closure wall supports 17, in the form of chains, cables, or the like, are respectively connected with hydraulic cylinders 18 or equivalent devices such as rope-and-reel means for actuating the supports 17. The several hydraulic cylinders 18 are pivotally connected at their upper ends 19 to the frames of the several compartment sections. The structure for supporting, opening and closing the walls 16 is substantially identical with the apparatus disclosed in Finnish Pat. No. 44,352. The apparatus of the invention has its compartment bottom walls 16 controlled in such a way that they can be swung at their left edges, as described above and shown in the drawings, the flexible supports providing for each wall 16 the capability of being at all times freely movable in an upward swinging direction at all stages of the opening thereof. While in the illustrated example the flexible supports 17 are in the form of chains, it is possible of course to use instead ropes, wires, or certain types of lever mechanisms which provide for each wall 16 the capability of yielding in an upward direction at all times. However, it is also possible to provide in addition an arrangement according to which the top end of each cylinder 18 is mounted in such a way that it is free to move upwardly in the event that a batch of timber moving to the right when carried by the upper run of the conveyer means 20 engages a closure wall 16 which happens to be turned downwardly to its open or partially open position.

The opening of the bottom walls 16 of the several compartment groups A–N takes place by remote control, for example by operating a selected switch at the console 25 shown in FIG. 2. Thus FIG. 2 schematically illustrates an operator 26 at the console 25.

The details of the method and apparatus of the invention in connection with the group of compartments A are illustrated in FIG. 3, and it will be understood that the same details are applicable to all of the groups. Thus, as may be seen from FIG. 3 the several hydraulic cylinders 18 of the group of compartments A are respectively operatively connected with a flexible tube, pipe or the like 31 which communicates with pressure fluid so that the pressure fluid can flow through the several pipes 31. The pressure fluid is delivered to the several cylinders 18 by way of a pump 30. Between the pump 30 and the several pipes or hoses 31 are the hydraulic valves 32 which serve to control the flow of pressure fluid from the pump 30 through the tubes 31. These valves 32 are controlled from the control unit 34 which is situated at the console 25. Thus the unit 34 includes a button which can be depressed by the operator for providing a control pulse. For example after the group of compartments A has been filled, the operator will push the proper button for transmitting a control pulse. This pulse is transmitted from the unit 34 to the timing means 33 such as, for example, a clock means, timing relays, or equivalent means provided with suitable electronic components. Immediately upon receiving this pulse, the hydraulic valve 32 which governs the operation of the hydraulic cylinder $18A_1$ of the first compartment $14A_1$ of this group is operated so that the first closure wall $16A_1$ starts to open. After a given time T has elapsed, as set into the control apparatus 33, this timing starting from the commencement of the opening of the compartments of the group A, the hydraulic cylinder $18A_2$ of the next compartment $14A_2$ receives its actuating command and starts to open this second compartment of this group. In a similar manner the compartment bottoms $16A_3$ and $16A_4$ will receive their opening commands after a time interval 2T and 3T, respectively, has measured from the start of the operation. The control command for closing the several compartments may be incorporated into the structure in accordance with a given program so as to follow automatically upon elapse of a given interval after the initial command for opening the first compartment, or instead the operator may at any desired time from the console 25 transmit a closing signal in such a way that all of the compartments of a given group A–N close simultaneously or with a predetermined timed relationship.

As is shown in FIG. 3, the timber pieces have completely emptied from the first compartment $14A_1$ to form on the upper run of the conveyer means 20 a layer m, and the next compartment $14A_2$ is shown in its final phase of emptying its timber contents to continue the layer m which is formed from the timber pieces of the first compartment. The closure wall $16A_3$ of compartment $14A_3$ has just started to open in the position of the parts shown in FIG. 3, and the last compartment $14A_4$ still has its closure wall $16A_4$ closed, the latter wall of course opening automatically after elapse of a predetermined time interval from the opening of the closure wall $16A_3$.

Of course, it may well happen with the method and apparatus of the invention that timber pieces from a compartment upstream of a particular compartment which has already been opened will strike against the bottom wall of the latter compartment which is still open or partly open, inasmuch as the time during which a compartment remains open must be long enough to make certain that the entire contents of a given compartment are emptied therefrom. Therefore the feature according to which the bottom walls 16 are capable at any time of yielding upwardly is of particular importance. At any time timber arriving from a location upstream of a given wall 16 which is in an open or partially open position can engage such a wall and displace it upwardly without damaging the parts, the flexible ropes or chains 17 yielding freely for this purpose in the particular example illustrated. Thus the apparatus of the invention will not be damaged under the above conditions and there will be no interruption in the operations resulting from such conditions. In addition there is the advantage that the timing of the closing of the different compartments of the several groups need not be very precise.

In accordance with the invention it is possible as a result of the above features to transfer the timber pieces on the conveyer means 20 in such a way as to form a uniform layer m of a relatively small height h, indicated in FIG. 3. As a result the conveyer 20 can be situated relatively close to the compartments 14, so that the timber pieces need not drop through a particularly great distance onto the conveyer means 20. The formation of such a uniform layer on the conveyer means 20 greatly facilitates the dispersing of the articles apart from each other in connection with packaging thereof.

As is shown in FIGS. 1 and 2, the units 23 separate the articles from each other to form a layer of single articles following one after the other so that they can conveniently be packaged by the structure 24 which is schematically illustrated. As was pointed out above, the packaging arrangement is preferably such that while a single package will be formed of the articles, such as timber pieces, received from a particular group of compartments, at the same time in each package there are subpackages each of which contains the articles from a single compartment of the particular group.

Of course the invention is not to be narrowly confined to the particular features set forth above. For example it is of course possible to provide for opening and closing the walls 16 relatively rigid structure, but in this case there is a considerable risk of damage either to the wall 16 or to the mechanism which operates the same. Moreover, if the height through which the articles must drop from the compartments 14 to the conveyer 20 is made so large that the timber batches transported by the conveyer means 20 will not engage the bottom closure wall 16, then there is the drawback that the timber pieces will be damaged during the dropping thereof through such a relatively large distance and/or they will be deposited in haphazard manner forming a non-uniform layer when the compartments are emptied.

What is claimed is:

1. In a method for handling articles, such as pieces of timber, of different types, the steps of subjecting the articles to a given treatement after receiving the articles from the discharge end of a conveyer, delivering articles of one type to a first plurality of compartments situated one after the other over said conveyer with one of the plurality of compartments situated nearer to the discharge end of the conveyer than the next compartment, delivering articles of a second type to a second plurality of compartments, also situated over the conveyer one after the other with one of the second plurality of compartments situated nearer to the discharge end of the conveyer then the next of said second plurality of compartments, and sequentially discharging the articles from a given one of said pluralities of compartments onto said conveyer first from that one of said given plurality of compartments which is nearest to said discharge end of the conveyer, in a manner providing on the conveyer an article layer of a given uniform depth, and then from the next of said given plurality of compartments according to a program which will provide on the conveyer with the articles from the latter next compartment an article layer also of said given uniform depth and forming a continuation of the article layer derived from said one of said given plurality of compartments which is nearest to the discharge end of the conveyer.

2. In a method as recited in claim 1 and wherein the treatment to which the articles are subjected upon being received from the discharge end of said conveyer is a packaging of the articles, said packaging being carried out in a manner forming from all of the articles from a given plurality of compartments one package having therein subsidiary packages each corresponding to the articles from a given compartment.

3. In a method as recited in claim 1 and wherein the discharge of articles from the next of said given plurality of compartments is started prior to completion of the discharge of articles from said one of said given plurality of compartments which is nearest to said discharge end of the conveyer.

4. In a method as recited in claim 1 and including the step of closing said one of said given plurality of compartments after discharge of articles therefrom has been completed but before discharge of articles from the last of said given plurality of compartments has been completed, so that delivery of articles to said one of said given plurality of compartments can be started before discharge of the articles from said given plurality of compartments has been completed.

5. In an apparatus for handling articles, such as pieces of timber, of different types, elongated conveyer means for conveying the articles to a given location situated at a discharge end of said elongated conveyer means, a plurality of compartments situated over said elongated conveyer means in a row distributed longitudinally along said elongated conveyer means, said compartments being arranged in a series of groups with each group having one compartment situated nearer to the discharge end of said conveyer means than the next compartment of said group, and each compartment having at a lower end thereof a means for opening and closing said compartment, so that when the several groups of compartments respectively have different types of articles therein, said means at the lower ends of said compartments can be operated to open the compartments to discharge the articles therefrom onto said conveyer means and then to close said compartments for receiving additional articles therein, and control means operatively connected with the means at the lower ends of each group of compartments for operating the latter means of each group sequentially according to a given program for discharging the articles from a compartment of a given group which is nearer to the discharge end of the conveyer means at least in part prior to discharge of articles from the next compartment of said given group and for achieving on said conveyer means from said compartment of a given group which is nearer to the discharge end of said conveyer means an article layer of a given uniform depth and from said next compartment of said given group an article layer which is also of said given uniform depth and which forms a continuation of the article layer from said compartment of said given group which is nearer to the discharge end of said conveyer means.

6. The combination of claim 5 and wherein said means at the lower end of each compartment includes a wall swingably connected to each compartment at a part thereof which is most distant from said discharge end of said conveyer and a yieldable means connected to the wall of each compartment for lowering and raising said wall for respectively opening and closing a compartment, said yieldable means supporting each wall in a manner according to which each wall can yield upwardly when engaged by articles conveyed by the conveyer means from a compartment more distant from a particular compartment the wall of which has been lowered.

7. The combination of claim 5 and wherein said given program provided by said control means starts the discharge of articles from said next compartment of said given group prior to completion of discharge of articles from said compartment of said given group which is nearer to the discharge end of the conveyer means.

8. The combination of claim 5 and wherein said program of said control means provides for operating said means at the lower ends of said compartments for closing said compartment of said given group which is nearer to the discharge end of the conveyer means upon completion of the discharge of articles therefrom but prior to completion of discharge of articles from the last compartment of said given group, so that additional articles may be received by the latter closed compartment even before completion of the discharge of articles from all of the compartments of said given group.

* * * * *